(12) United States Patent
Lozano

(10) Patent No.: US 9,494,978 B2
(45) Date of Patent: Nov. 15, 2016

(54) POWER LINE DOCKING STATION APPARATUS

(71) Applicant: Hanni B. Lozano, Vancouver (CA)

(72) Inventor: Hanni B. Lozano, Vancouver (CA)

(*) Notice: Subject to any disclaimer, the term of this patent is extended or adjusted under 35 U.S.C. 154(b) by 334 days.

(21) Appl. No.: 14/303,258

(22) Filed: Jun. 12, 2014

(65) Prior Publication Data
US 2014/0368989 A1 Dec. 18, 2014

Related U.S. Application Data

(60) Provisional application No. 61/834,548, filed on Jun. 13, 2013.

(51) Int. Cl.
*G06F 1/16* (2006.01)
*G06F 1/26* (2006.01)
*H01R 29/00* (2006.01)

(52) U.S. Cl.
CPC ............ *G06F 1/1632* (2013.01); *G06F 1/266* (2013.01); *G06F 2200/261* (2013.01); *H01R 29/00* (2013.01); *Y02B 60/1296* (2013.01)

(58) Field of Classification Search
CPC .................................................. G06F 1/1632
See application file for complete search history.

(56) References Cited

U.S. PATENT DOCUMENTS

| | | | |
|---|---|---|---|
| 5,566,879 A | 10/1996 | Longtin | |
| 5,864,708 A * | 1/1999 | Croft | G06F 1/1632 370/521 |
| 5,942,814 A * | 8/1999 | Sutterlin | H02J 13/0048 307/125 |
| 6,375,344 B1 | 4/2002 | Hanson | |
| 6,449,533 B1 | 9/2002 | Mueller | |
| 6,912,429 B1 | 6/2005 | Bilger | |
| 6,993,289 B2 * | 1/2006 | Janik | G06F 1/1632 320/107 |
| 7,401,239 B2 | 7/2008 | Chan | |
| 7,979,164 B2 | 7/2011 | Garozzo | |
| 8,229,501 B2 | 7/2012 | Struthers | |
| 8,269,622 B2 | 9/2012 | Chan | |
| 8,527,688 B2 | 9/2013 | Chatterjee | |
| 8,554,045 B2 | 10/2013 | Brooking | |
| 2003/0236010 A1 * | 12/2003 | Gorman | H01R 31/065 439/107 |
| 2007/0220907 A1 * | 9/2007 | Ehlers | F25B 49/005 62/126 |
| 2009/0174998 A1 * | 7/2009 | Struthers | H04H 20/63 361/679.41 |
| 2010/0315210 A1 * | 12/2010 | Travis | G06F 1/266 340/538 |
| 2011/0016249 A1 | 1/2011 | Nakabo | |
| 2011/0119515 A1 * | 5/2011 | Sadwick | G01D 4/002 713/340 |
| 2012/0092377 A1 | 4/2012 | Stein | |
| 2013/0003792 A1 * | 1/2013 | Hu | H04M 11/066 375/219 |
| 2013/0013938 A1 * | 1/2013 | Abdelsamie | G06F 1/26 713/310 |
| 2014/0244882 A1 * | 8/2014 | Struthers | G06F 1/1632 710/303 |

* cited by examiner

*Primary Examiner* — Anthony Q Edwards

(57) ABSTRACT

A docking station apparatus for portable devices adapted to network with other apparatus such as climate control docking stations, temperature sensors, electrical power switches, etc., over the power line. The docking station has a connector adapted to accept a plurality of portable devices as well as a wireless connection for remote access. The docking station is also adapted to turn off the wireless interface under certain conditions in order to free up the wireless bandwidth for higher data rate applications.

20 Claims, 5 Drawing Sheets

POWER LINE DOCKING STATION APPARATUS

CROSS-REFERENCE TO RELATED APPLICATIONS

This application claims benefit of PPA Ser. No. 61/834,548 filed Jun. 13, 2013 by the present inventor.

FIELD OF THE INVENTION

This invention relates to docking station apparatus for portable devices adapted to communicate over the power lines.

BACKGROUND OF THE INVENTION

Recent market research studies have shown that a growing number of users rely solely on their portable device such as smart phones as the primary interface for accessing and programming their home automation products such as thermostats. However, the majority if not all of these products sold in the market today still incorporate the traditional keyboard/display interface, especially for thermostats. In a multi-zone climate control system where multiple thermostats are deployed, the less frequently used keyboard/display interface is replicated in each thermostat which unnecessarily increases the overall cost of the system. An obvious solution would be to design wireless-only thermostats without the keyboard/display interface. The drawback of this simplistic solution is that every time a wireless thermostat, or in general any wireless device such as a wirelessly controlled light switch, etc., is added to the wireless network, the wireless router allocates a fixed portion of the available wireless bandwidth to the device despite that these devices operate at a very low data rate. Therefore, using wireless-only thermostats, light switches, etc. will waste valuable wireless bandwidth that is better reserved for applications that require high data rate such as video streaming.

It has been suggested that using the power line as a communication medium instead of the wireless network will free up wireless bandwidth allocated to low data rate devices such as thermostats. To the best of our knowledge we are not aware of any commercial product that takes advantage of power line networking in order to reduce the hogging of the wireless bandwidth by low data rate devices. In fact, all power line products introduced up to date combine power line access with wireless access in every single device which obviates any advantage of using the power line as discussed above. In addition, the keyboard/display interface is also replicated, more likely than not, in every single device.

SUMMARY

The present invention introduces a docking station apparatus for portable devices adapted to network with other apparatus such as climate control docking stations, temperature sensors, electrical power switches, etc., over the power line. The docking station has no keyboard/display interface, which is rarely used by a growing majority of users; instead, the docking station is adapted to be accessed from a portable device through a local connector such as MicroUSB and/or a wireless connection such as WiFi for remote access. When the portable device is docked, i.e. connected to the local connector on the docking station, the user has the option to turn the wireless interface off to save power and reduce wireless bandwidth usage.

Although, a single docking station with embedded sensors such as temperature, humidity, etc. can manage multiple HVAC (Heating, Ventilating & Air-Conditioning) units simultaneously, additional docking stations can be added for enhanced functionality, for example creating multiple climate zones where each zone is controlled by a separate docking station. Regardless of how many docking stations are installed, only a single wireless connection is needed to allow any number of portable devices to remotely control all the devices, e.g. HVAC, light switches, etc., installed on the same power line.

We would like to draw the reader's attention that the term "portable device" is used in this document to refer to any portable devices capable of communicating with any other device using wireless connectivity. Examples of portable devices are, but not limited to: cellular phones, tablets, laptops, cordless devices that are widely used in homes and offices and infrared waves devices.

DETAILED DESCRIPTION

Figure 1A:
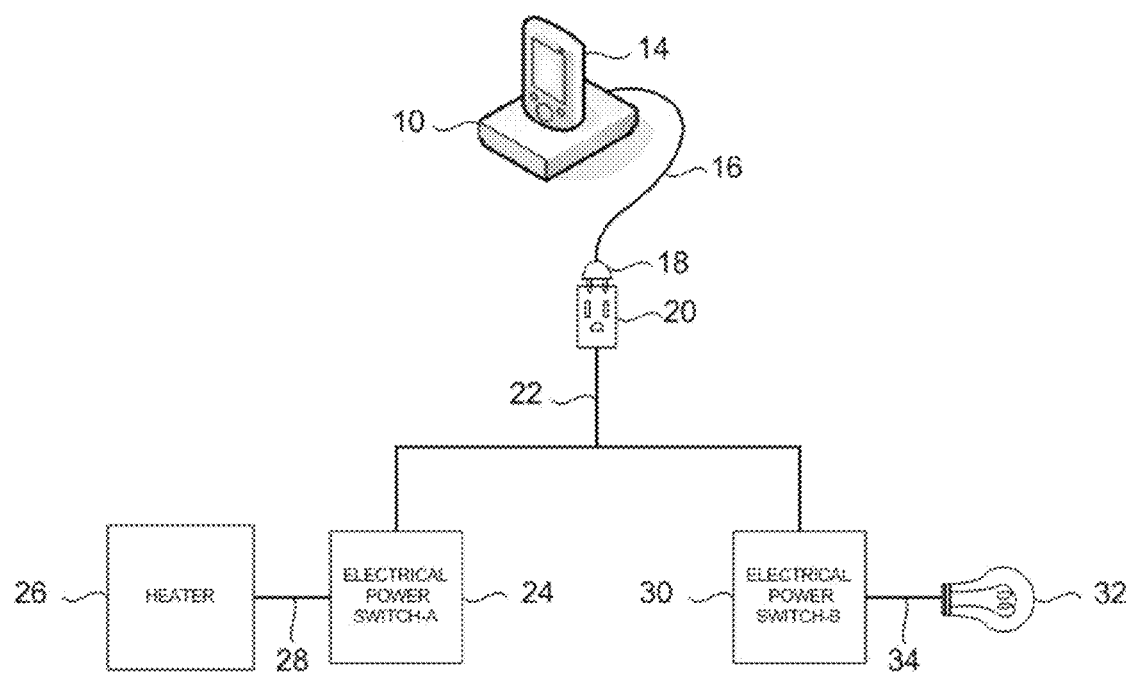
FIG. 1A shows the preferred embodiment of the invention with the portable device installed in the docking station.
Figure 1B:
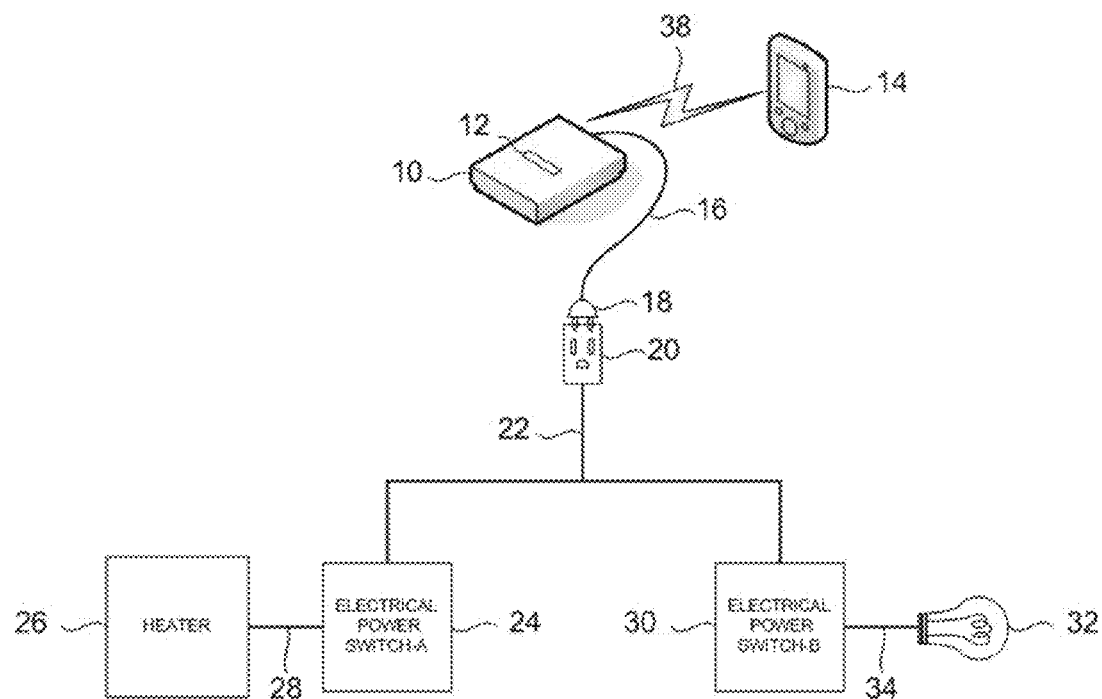
FIG. 1B shows the preferred embodiment of the invention with the portable device removed from the docking station.

FIG. 1A and FIG. 1B Preferred Embodiment

A preferred embodiment of the invention is illustrated in FIG. 1A. A docking station 10 is adapted to accept a portable device 14 using a connector 12 (FIG. 1B) mounted on the docking station 10. The docking station 10 is connected to an AC (Alternating Current) power line 22 using an AC power cord 16 and an AC plug 18 that plugs into an AC outlet 20. The docking station 10 is connected to an electrical power switch-A 24 and an electrical power switch-B 30 via the power line 22. The electrical power switch-A is connected to a heater 26 using a dedicated power line 28 and, similarly, the electrical power switch-B 30 is connected to a light bulb 32 using power line extension 34.

Figure 3:
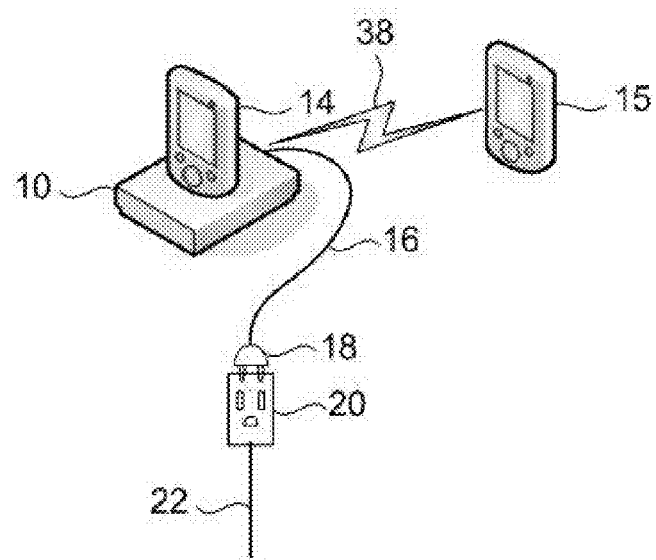
FIG. 3 shows the preferred embodiment of the invention with multiple portable devices.

When the wireless device 14 is undocked, i.e. disconnected from the connector 12 (FIG. 1B), a wireless connection 38 is established between the portable device 14 and the docking station 10. The wireless connection 38 in FIG. 1B is either a point-to-point connection or a wireless network connection using a wireless router (not shown) that will handle bandwidth allocation as well as the routing of data traffic from the docking station 10 to the portable device 14 and vice versa. When the portable device 14 is docked, the wireless connection 38 is not needed and can be optionally turned off to save power and free up the wireless bandwidth allocated to the docking station 10. Alternatively, the wireless connection 38 can be left on in order to allow other portable devices to remotely connect to the docking station 10 even when the portable device 14 is docked (FIG. 3).

Figure 2:
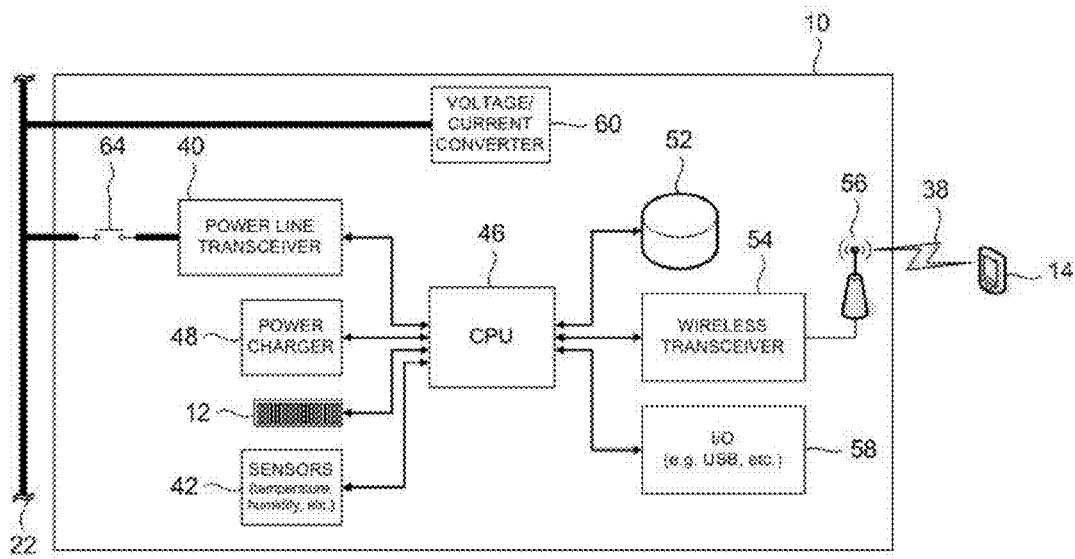
FIG. 2 shows a block diagram of the internal structure of the docking station.

An internal block diagram of the docking station 10 is shown in FIG. 2. A power line transceiver 40 is responsible for transmitting and receiving data messages over the power line 22. Switch-A 24 and switch-B 30 also contain a power transceiver identical to the power transceiver 40 to facilitate communication with the docking station 10 over the power line 22. When receiving a message from switch-A 24 or switch-B 30, the power line transceiver 40 decouples the analog signal that contains the message from the AC power line 22 and extracts the data embedded in the message. The extracted data is then processed locally by a Central Processing Unit (CPU) 46 which stores it in a local storage 52 for future reference. The extracted data can also be forwarded to the portable device 14 for display using one of the means available for connecting the docking station 10 to the portable device 14. When transmitting a message from the docking station 10 to switch-A 24 or to switch-B 30, the reverse procedure is performed and the message is first processed by the CPU 46 which forwards it to the power line transceiver 40 for encoding and transmission over the power line 22 to its final destination.

The CPU 46 manages and coordinates all the functions of the docking station 10, such as activating a power charger 48 to charge the portable device 14 when it is attached to connector 12, storing and retrieving data from the local storage 52, communicating with the power line transceiver 40, communicating with a wireless transceiver 54, interfacing to the optional I/O connectors 58 and managing a plurality of sensors 42 such as temperature sensor, humidity sensor, etc. An internal antenna 56 is attached to the wireless transceiver 54, or alternatively embedded in the wireless transceiver 54, to enable communication with the portable device 14.

A mechanical switch 64 powers the docking station on and off. A number of optional (not shown) Light Emitting Diodes (LED) indicate the operational status of the docking station such as power on LED, data transmitting LED, error LED, etc.

A voltage/current converter 60 converts the AC power line voltage/current to a DC voltage/current for supplying the docking station with the needed voltage/current levels. The voltage/current converter 60 can also generate the required voltage/current level used by the power charger 48 that charges the portable device 14 when it is docked. Alternatively, a separate voltage/current converter is used for the power charger 48 if needed.

Operation

When used as a climate control apparatus, the docking station 10 retrieves the current temperature from all the temperature sensors under its own management at regular intervals. The captured temperature readings are transmitted to the portable device 14 and/or, simultaneously, stored in the local storage 52 for future reference. This automatic temperature reading procedure is also used to monitor and maintain the current temperature at a specific level that was previously programmed or set by the user. Embedded software installed on the portable device 14 handles the interface between the user and the docking station 10 which serves as a gateway to all the devices installed on the same power line 22 and fitted with a power line transceiver 40. The embedded software intercepts user requests such as "display current temperature", "update current temperature", etc. as well as programming commands through a plurality of means such as touch screen, keyboard, voice command, etc. and forwards these requests to the docking station 10 using the connector 12 and/or the wireless connection 38.

In case there are multiple thermostats, electrical power switches, etc. installed on the same power line 22, the user needs to select the target device from a list of available devices. The embedded software appends a device ID to the final request which gets sent to the docking station 10. Once received, the CPU 46 translates each request to a unique message that contains a command field and a destination field. The command field indicates the type of action to be taken by a specific device, e.g. raise temperature, whereas the destination field indicates the target device, e.g. the device ID of heater 26.

Referring to the preferred embodiment of the invention in FIG. 1A, to increase the current room temperature up by 2 degrees Celsius, for example from 20 degree Celsius to 22 degrees Celsius, first, the user needs to select the target thermostat from a list of available thermostats or zones if referring to a multi-zone climate control environment. In this particular example, there is only one available thermostat which is the docking station 10. Next, a request to increase temperature is conveyed using one the means available on the portable device 14 such as touch screen, voice command, etc. The embedded software captures the request (raise temperature) and the device ID assigned to the docking station 10 and forwards them to the docking station 10. After receiving the temperature increase request from the portable device 14, the CPU 46 sends a status check command to the electrical power switch-A 24 attached to the docking station 10. The status check command will help the CPU 46 determine what type of command it should send to the switch-A 24 in order to increase the temperature by 2 degrees Celsius. For example, if the heater is currently turned off then the docking station 10 will send the switch-A 24 a command to turn on the power supply in order to restart the heater and increase the temperature, otherwise, if the heater is turned on then no further action is required. The new target temperature for the docking station 10 will be set to 22 degrees Celsius and stored in the local storage 52 for future reference.

The docking station 10 can be programmed by the user, using the embedded software installed in the portable device 14, to automatically update the temperature for all devices managed by the docking station 10 based on a specific daily, weekly, monthly, etc. schedule. The programmed schedule for each device is stored in the local storage 52 and can be retrieved by the CPU 46 when needed. When used with other home automation products such as remote lights control, the docking station can be programmed to switch certain lights on or off at specific times during the day and/or for specific duration, intervals, etc. In case of the preferred embodiment, the docking station 10 will regularly send control commands to switch-B 30 to check the status of the light bulb 32, i.e. on or off, and implement the corresponding automatic schedule program, if any.

An important feature of the invention is to eliminate the hogging of the wireless bandwidth by low data rate devices such as thermostats, light switches, etc. Although, using a single wireless connection 38 to link the portable device 14 to all the devices installed on the same power line will considerably reduce bandwidth usage, a single wireless connection can take a large chunk of the available wireless bandwidth which would seriously affect the performance of high data rate applications such as streaming video. Therefore, in some special cases it makes sense to entirely turn off wireless connectivity in the docking station 10 to completely eliminate bandwidth waste. Turning off the wireless interface 38 can be programmed by the user using the embedded software in the portable device 14. Alternatively, the user can override the pre-programmed setting for the wireless interface and turn off or on manually anytime using a software option in the same embedded software. Even when the wireless interface is turned off, the user can still use the embedded software to update temperature settings, program the docking station(s), etc.; however, these updates will only take effect the next time the portable device 14 is docked into the docking station 10. Another limitation of turning off wireless connectivity is that the current temperature, light status, etc. cannot be displayed on the portable device 14 unless the portable device 14 is docked. An alternative solution is to turn on the wireless interface on the docking station 10 for short repeatable intervals that are long enough to only update the current status for all managed devices and display the relevant data on the portable device 14 and/or store it in the local storage 52 as well as download any new settings into the docking stations(s) to update the status of the devices.

When docked the power charger 48 will charge the portable device 14 by converting the power line 22 voltage into a suitable voltage for the portable device 14. A LED indicator will let the user know that the portable device 14 is being charged or is already charged.

Additional Embodiments

FIG. 3 to FIG. 7

FIG. 3 shows multiple portable devices connecting simultaneously to the docking station 10 using different means of communication. The first portable device 14 is connected to the docking station 10 via the connector 12. The second portable device 15 is connected to the docking station 10 via the wireless connection 38. Multiple portable devices can easily connect to a single docking station simultaneously. The docking station 10 uses internal software, hardware or a combination of a software and hardware to arbitrate between the multiple portable devices that are concurrently connected to the docking station 10.

Figure 4:
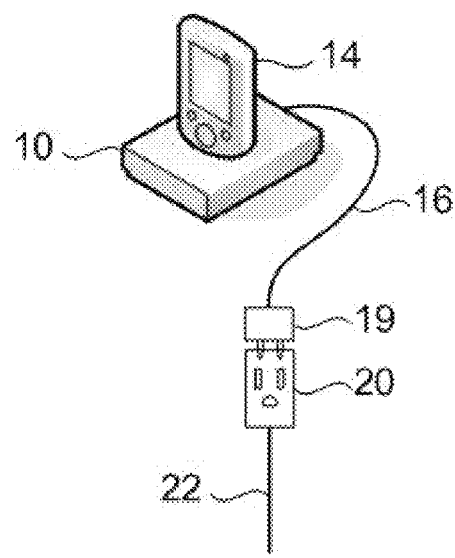
FIG. 4 to FIG. 7 show alternative embodiments of the invention.

In FIG. 4 the AC plug 18 is replaced with an AC adapter like enclosure 19 that houses all or some of the electronics contained in the docking station 10 (FIG. 2).

Figure 5:
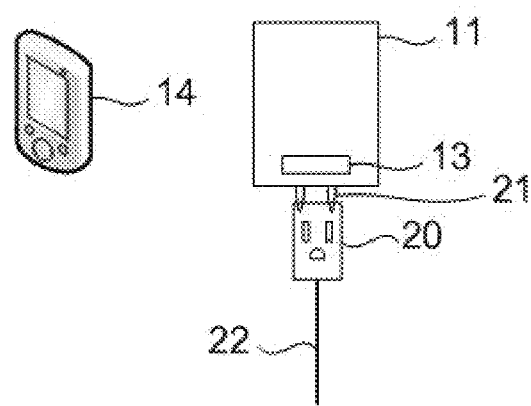

In FIG. 5 the docking station enclosure 11 has an embedded AC plug 21 that plugs into the AC outlet 20. A connector 13 connects the portable device 14 to the docking station 11 similar to the connector 12 on the docking station 10. The docking station 11 has all the functionalities of the docking station 10 discussed in the preferred embodiment of the invention.

Figure 6:
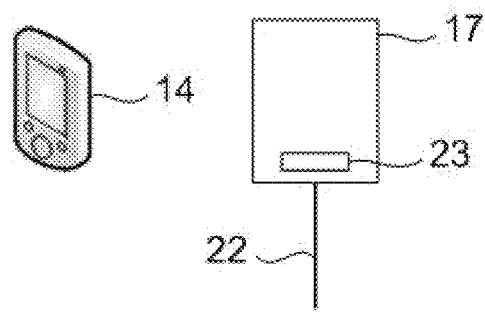

In FIG. 6 the docking station 17 is connected to the AC power line 20 by directly tapping into the wires. A connector 23 connects the portable device 14 to the docking station 17 similar to the connector 12 on the docking station 10. The docking station 17 has all the functionalities of the docking station 10 discussed in the preferred embodiment of the invention. This additional embodiment of the invention is useful for wall mounted installation compared to being placed on top of a horizontal surface.

Figure 7:
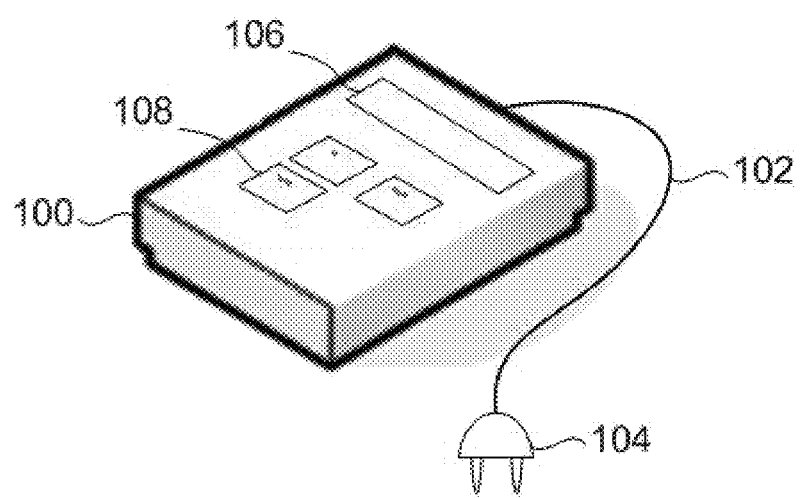

FIG. 7 shows an additional embodiment of the invention, where the docking station 100 is connected to the power line using an AC power cord 102 and an AC power plug 104. The difference with the preferred embodiment in FIG. 1A and FIG. 1B is the inclusion of a display means 106 to display data generated and/or collected by the docking station 100 and/or a command entry means 108 such as keyboard, touch screen, etc. to allow user to enter request directly into the docking station 100 instead of using a portable device. If using a touch screen then the display means 106 and command entry means can be combined into a single unit. Variation of the embodiment in FIG. 7 includes a connector (not shown) similar to the connector 12 in FIG. 1B in addition to the display 106 and command entry 108 means as well as any feasible combination of these means, i.e. connector, display and command entry.

Alternative embodiments of the docking station 10 may include a wired transceiver, e.g. Ethernet transceiver, in addition to or in place of the wireless transceiver 54. The wired transceiver will connect the docking station to the Ethernet network and allow the user to access the functions of the docking station remotely.

It will be readily apparent to a person skilled in the art that a number of variations and modifications can be made without departing from the true spirit of the invention which will now be pointed out in the appended claims.

I claim:

1. A docking station for controlling a plurality of devices connected to a power line comprising:
    (a) a central processor for managing a plurality of functions in said docking station;
    (b) storage means for storing data and a variety of software;
    (c) connection means for connecting said docking station to said power line;
    (d) a transceiver for transmitting data to and receiving data from said docking station to said plurality of devices over said power line;
    (e) voltage and current conversion means for converting AC power line voltage and current level to voltage and current level suitable for said docking station;
    (f) a connector for receiving a portable device;
    (g) power charging means for charging said portable device when said portable device is docked in said docking station;
    (h) wireless connection means for connecting said portable device to said docking station;
    (i) a plurality of sensing elements for capturing a plurality of measurements;
    whereby a user can access said docking station in addition to said plurality of devices using said portable device.

2. The docking station of claim 1 wherein said connection means for connecting said docking station to said power line is comprised of a power cord and an AC plug attached to said power cord.

3. The docking station of claim 1 wherein said connection means for connecting said docking station to said power line is comprised of an AC plug embedded into said docking station enclosure.

4. The docking station of claim 1 wherein said connection means for connecting said docking station to said power line is comprised of a direct connection between said docking station and said power line.

5. The docking station of claim 2 wherein said AC plug is an AC adapter-like plug that contains all the elements in claim 1 excluding said connector, said plurality of sensing elements and said wireless transceiver.

6. The docking station of claim 2 wherein said AC plug is an AC adapter-like plug that contains some of the elements in claim 1 and wherein the rest of the elements are housed in said docking station.

7. The docking station of claim 1 including a detection means for detecting when said portable device is docked in said docking station and switching off said wireless connection means without said user intervention.

8. A docking station for controlling a plurality of devices connected to a power line comprising:
 (a) a central processor for managing a plurality of functions in said docking station;
 (b) storage means for storing data and a variety of software;
 (c) connection means for connecting said docking station to said power line;
 (d) a transceiver for transmitting data to and receiving data from said docking station to said plurality of devices over said power line;
 (e) voltage and current conversion means for converting AC power line voltage and current level to voltage and current level suitable for said docking station;
 (f) wireless connection means for connecting said portable wireless device to said docking station;
 (g) a plurality of sensing elements for capturing a plurality of measurements;
 (h) display means for displaying visual information to said user;
 (i) command entry means for allowing a user to interact with said docking station;
 whereby a user can access said docking station in addition to said plurality of devices using said portable device.

9. The docking station of claim 8 wherein said connection means for connecting said docking station to said power line is comprised of a power cord and an AC plug attached to said power cord.

10. The docking station of claim 8 wherein said connection means for connecting said docking station to said power line is comprised of an AC plug embedded into said docking station enclosure.

11. The docking station of claim 8 wherein said connection means for connecting said docking station to said power line is comprised of a direct connection between said docking station and said power line.

12. The docking station of claim 9 wherein said AC plug is an AC adapter-like plug that contains some of the elements in claim 8 and wherein the rest of the elements are housed in said docking station.

13. The docking station of claim 8 including a detection means for detecting when said portable device is docked in said docking station and switching off said wireless connection means.

14. A docking station for controlling a plurality of devices connected to a power line comprising:
 (a) a central processor for managing a plurality of functions in said docking station;
 (b) storage means for storing data and a variety of software;
 (c) connection means for connecting said docking station to said power line;
 (d) a transceiver for transmitting data to and receiving data from said docking station to said plurality of devices over said power line;
 (e) voltage and current conversion means for converting AC power line voltage and current level to voltage and current level suitable for said docking station;
 (f) a connector for receiving a portable device;
 (g) power charging means for charging said portable device when said portable device is docked in said docking station;
 (h) wireless connection means for connecting said portable device to said docking station;
 whereby a user can access said docking station in addition to said plurality of devices using said portable device.

15. The docking station of claim 14 including a plurality of sensing elements for capturing a plurality of measurements.

16. The docking station of claim 14 wherein said connection means for connecting said docking station to said power line is comprised of a power cord and an AC plug attached to said power cord.

17. The docking station of claim 14 wherein said connection means for connecting said docking station to said power line is comprised of an AC plug embedded into said docking station enclosure.

18. The docking station of claim 14 wherein said connection means for connecting said docking station to said power line is comprised of a direct connection between said docking station and said power line.

19. The docking station of claim 15 wherein said AC plug is an AC adapter-like plug that contains some of the elements in claim 14 and wherein the rest of the elements are housed in said docking station.

20. The docking station of claim 14 including a detection means for detecting when said portable device is docked in said docking station and switching off said wireless connection means.

* * * * *